United States Patent
Kaito et al.

(10) Patent No.: US 8,900,770 B2
(45) Date of Patent: Dec. 2, 2014

(54) FUEL CELL SYSTEM AND OPERATION METHOD THEREOF

(75) Inventors: Takahiro Kaito, Yokosuka (JP); Keigo Ikezoe, Ayase (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 684 days.

(21) Appl. No.: 12/529,795

(22) PCT Filed: Jun. 18, 2008

(86) PCT No.: PCT/IB2008/001585
§ 371 (c)(1),
(2), (4) Date: Mar. 18, 2010

(87) PCT Pub. No.: WO2008/155628
PCT Pub. Date: Dec. 24, 2008

(65) Prior Publication Data
US 2010/0167144 A1    Jul. 1, 2010

(30) Foreign Application Priority Data

Jun. 20, 2007  (JP) .................................. 2007-162905
Jun. 20, 2007  (JP) .................................. 2007-162906
Feb. 22, 2008  (JP) .................................. 2008-041829

(51) Int. Cl.
*H01M 8/04* (2006.01)
*H01M 8/10* (2006.01)
*H01M 8/06* (2006.01)

(52) U.S. Cl.
CPC *H01M 8/10* (2013.01); *H01M 8/06* (2013.01); *H01M 8/04* (2013.01); *Y02E 60/521* (2013.01); *Y02E 60/50* (2013.01)
USPC ............................. 429/450; 429/429; 429/430

(58) Field of Classification Search
USPC ............................................... 429/13, 23, 450
See application file for complete search history.

(56) References Cited

U.S. PATENT DOCUMENTS

| | | | |
|---|---|---|---|
| 2007/0026276 A1* | 2/2007 | Ogawa et al. | 429/22 |
| 2007/0184317 A1* | 8/2007 | Wake et al. | 429/23 |
| 2009/0029200 A1* | 1/2009 | Izutani et al. | 429/13 |

FOREIGN PATENT DOCUMENTS

| | | | | |
|---|---|---|---|---|
| JP | 2001-209634 | | 8/2001 | |
| JP | 2002-246053 | * | 8/2002 | .............. H01M 8/04 |
| JP | 2005-285610 | | 10/2005 | |
| JP | 2006-100093 | | 4/2006 | |
| JP | 2006-351280 | | 12/2006 | |
| JP | 2007-35389 | | 2/2007 | |
| JP | 2007-123158 | | 5/2007 | |
| JP | 2007-207716 A | * | 8/2007 | .............. H01M 8/00 |
| JP | 2007-207724 | | 8/2007 | |
| JP | 2008-066041 | | 3/2008 | |
| WO | WO 2007/091137 | | 8/2007 | |

* cited by examiner

*Primary Examiner* — Ula C. Ruddock
*Assistant Examiner* — Osei Amponsah
(74) *Attorney, Agent, or Firm* — Drinker Biddle & Reath LLP

(57) ABSTRACT

A fuel cell system and a method for controlling the same. The system and method employ a fuel cell stack that generates electrical power by electrochemical reaction of a fuel gas and an oxidant gas, a total generated electrical energy computation device that computes a value pertaining to the total generated electrical energy as the sum of the electrical energy generated by said fuel cell stack from start-up of the fuel cell system, and a residual water volume estimation device that estimates the residual water volume left in the fuel cell stack based on said value pertaining to said total generated electrical energy computed by said total generated electrical energy computation device.

15 Claims, 12 Drawing Sheets

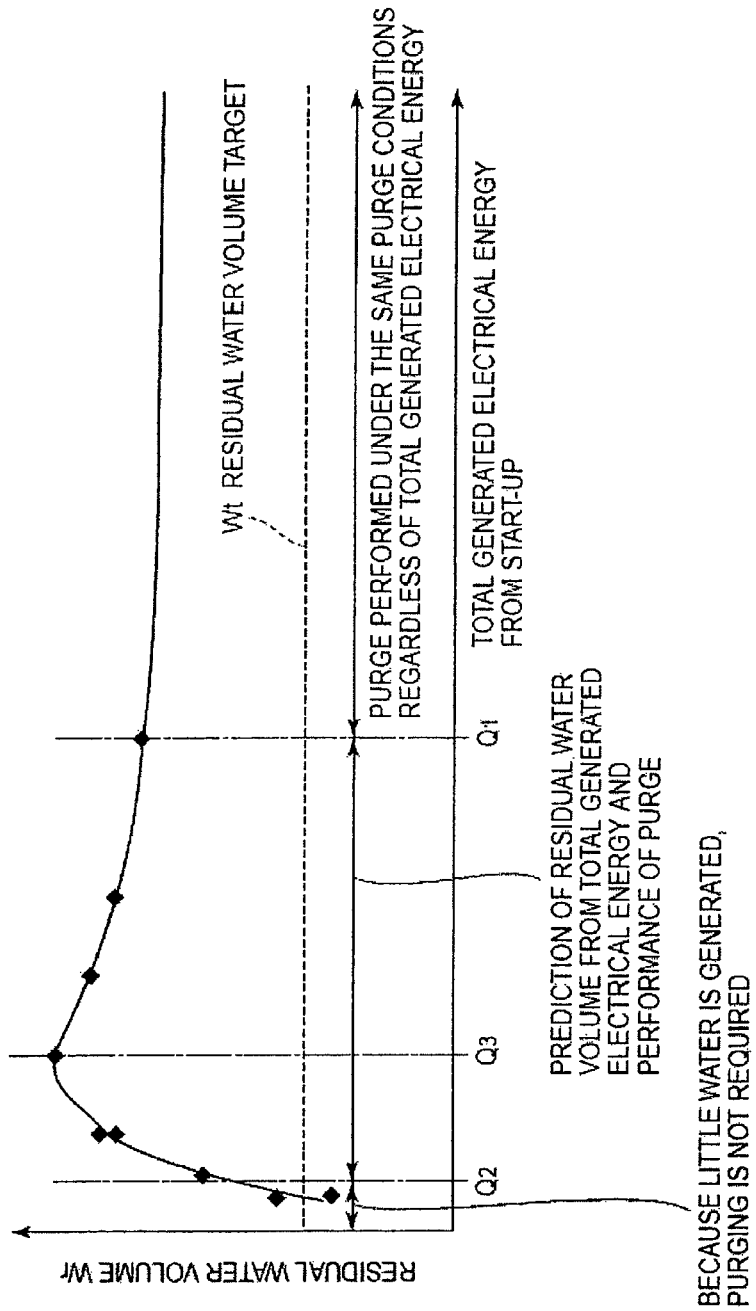

FUEL CELL SYSTEM AND OPERATION METHOD THEREOF

CROSS-REFERENCE TO RELATED APPLICATIONS

This application claims priority to Japanese Patent Application No. 2007-162905, filed Jun. 20, 2007, Japanese Patent Application No. 2007-162906, filed Jun. 20, 2007 and Japanese Patent Application No. 2007-041829, filed Feb. 22, 2008, the entire contents of which are incorporated by reference herein.

BACKGROUND OF THE INVENTION

1. Field of the Invention

The present invention relates generally to a type of fuel cell system and a method of operating the fuel cell system.

2. Description of the Related Art

In a solid-state polymer type fuel cell, an anode catalyst electrode layer and a cathode catalyst electrode layer are respectively arranged on the two surfaces of a solid-state polymer electrolyte membrane having hydrogen ion conductivity to form a membrane electrode assembly (MEA). Then, when a fuel gas containing hydrogen is fed to the anode catalyst electrode layer while air containing oxygen is fed to the cathode catalyst electrode layer, the following electrochemical reactions take place:

$$[\text{Anode}] 2H_2 \rightarrow 4H^+ + 4e^- \quad \text{(Equation 1)}$$

$$[\text{Cathode}] O_2 + 4H^+ + 4e^- \rightarrow 2H_2O \quad \text{(Equation 2)}$$

Good hydrogen ion conductivity is exhibited in the solid-state polymer electrolyte membrane when the membrane contains water. Consequently, during operation of a fuel cell system, it is necessary to humidify the solid-state polymer electrolyte membrane appropriately. Also, water is generated in the electrochemical reaction shown in Equation 2 above at the cathode.

When said solid-state polymer type fuel cell is in a shutdown state, the interior of the fuel cell should have a water content most appropriate for restart. In particular, a technology described in Japanese Kokai Patent Application No. 2005-209634 has been developed for fuel cell systems to be used in environments below the freezing point wherein the water contained may freeze and clog the gas flow paths, and so on. According to this technology, when the fuel cell system is shut down, a purge should be performed so that the residual water content is optimum to ensure that residual water will not clog the flow paths, and that the resistance of the electrolyte membrane will not become excessively high. In addition, with regard to the method for judging the optimum residual water content condition, a determination may be made that the optimum residual water content condition is met when the gas pressure differential between the inlet and outlet of the reaction gas flow path is below a prescribed level, and the membrane resistance of the electrolyte membrane exceeds a prescribed level.

In the aforementioned methods, however, the water/air purge process performed before the system is shut down is finished very quickly. Consequently, there is little change in the electrolyte membrane resistance. As a result, it is difficult to estimate the amount of residual water left in the fuel cell stack based on the resistance of the electrolyte membrane, which can be problematic.

SUMMARY OF THE INVENTION

The embodiments of the present invention described herein thus can eliminate the problems discussed above by providing a type of fuel cell system comprising a total generated electrical energy computation device that computes a value pertaining to the total generated electrical energy as the sum of the electrical energy generated by said fuel cell stack from start-up of the fuel cell system, and a residual water volume estimation device that estimates the residual water volume left in the fuel cell stack based on said value pertaining to said total generated electrical energy.

Also, the embodiments of present invention described herein provide a method of operating a fuel cell system comprising a total generated electrical energy computing step in which a value pertaining to the total generated electrical energy as the sum of the electrical energy generated by said fuel cell stack from start-up of the fuel cell system, and a heating step in which the residual water in the fuel cell stack generates electrical power based on said total generated electrical energy.

Also, the embodiments of the present invention described herein provide a method of operating a fuel cell system comprising a total generated electrical energy computing step in which a value pertaining to the total generated electrical energy as the sum of the electrical energy generated by said fuel cell stack from start-up of the fuel cell system, and a warm-up step in which said fuel cell stack generates electrical power based on said total generated electrical energy when the fuel cell system is started.

Accordingly, the embodiments of the present invention can make it possible to estimate the residual water volume based on the total generated electrical energy from start-up. Consequently, it is possible to estimate the residual water volume with a high reliability.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 6 is a diagram illustrating an example of the map for estimating the residual water volume from the total generated electrical energy during the period from start-up of the fuel cell system to shutdown of power generation in the first embodiment of the present invention;

DESCRIPTION OF THE PREFERRED EMBODIMENTS

Embodiment of the present invention will now be explained in more detail with reference to figures. In the embodiments presented below, the exemplary fuel cell system can be of the type for use in a fuel cell automobile, although the fuel cell system can be used in any environment.

First, basic exemplary concepts of the embodiments of present invention will be explained. In a solid-state polymer type fuel cell, water is generated due to the electrochemical reactions. Consequently, when the fuel cell system is shut down, if the temperature of the interior of the fuel cell stack falls below 0° C., the water generated in the fuel cell stack will freeze. Hence, when an attempt is made to start the fuel cell stack at a temperature below 0° C., although the reaction gases are fed to the anode and cathode, they cannot reach the catalyst reaction surface, so the fuel cell stack cannot be started.

In order to solve this problem, a water/air purge process should be performed to remove the water contained in the fuel cell stack before operation of the fuel cell system is shut down. For the convenience of the automobile driver, the time required to perform said water/air purge process should be as short as possible. If the time is too short, however, the water purge will be insufficient, diffusion of the gases will be hindered as explained above, and it generally will be impossible to start the cell below 0° C. On the other hand, if the water/air purge process is performed for too long a time, the solid-state polymer membrane will dry out. Consequently, the proton conductivity will be low when starting below 0° C., so that the start-up output power below 0° C. will be insufficient for driving, which is undesirable. Also, in the water/air purge process performed before the shutting down operation, it is important to ensure that the water content kept in the fuel cell stack, that is, the residual water volume, is estimated or detected, so that the water/air purge process is performed to achieve the optimum wet state.

Figure 4:
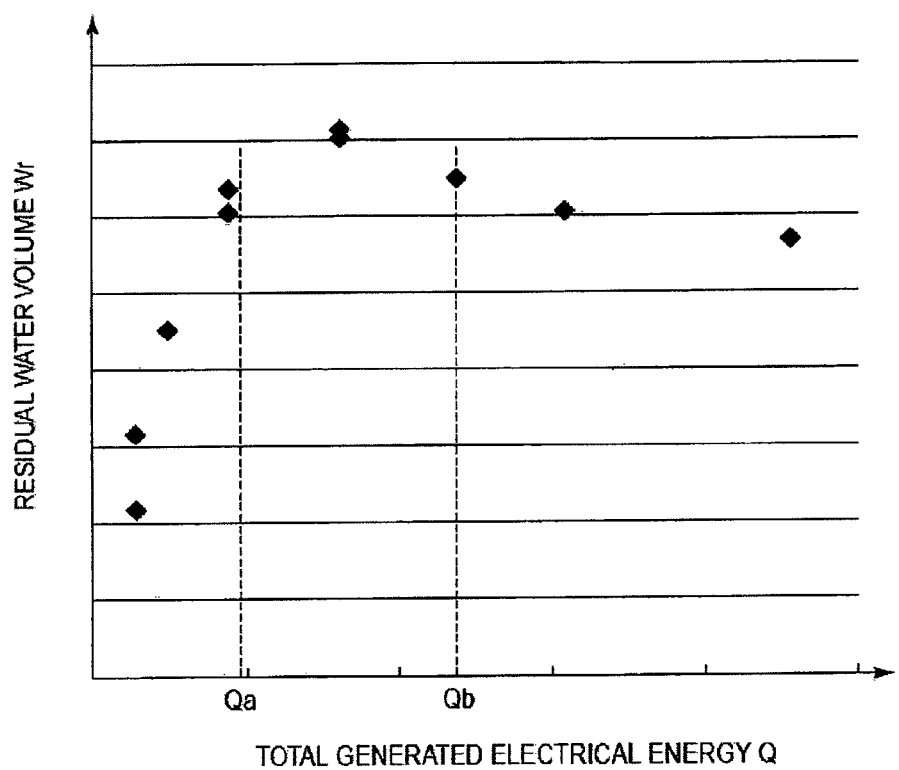
FIG. 4 is a diagram illustrating an example of the residual water volume as well as the relationship between the total generated electrical energy from start-up and the residual water volume.

Variations in the residual water volume in the fuel cell stack in the period from start-up of the fuel cell system to the steady state will now be explained with reference to FIG. 4 and FIGS. 5A through 5C. First, an explanation will be provided with reference to FIG. 4. From the open circuit state, power generation is started with a certain load, and power generation is shut down when a prescribed total generated electrical energy is reached. The residual water volume in MEA is then measured. The experimental results in this case are shown in FIG. 4, which illustrates an example of the variation in the residual water volume versus the total generated electrical energy. When the total generated electrical energy reaches a certain level, the residual water volume reaches a maximum water volume. When the total generated electrical energy is increased further, the residual water volume decreases. Finally, the residual water volume falls to a prescribed level. This data has been ascertained from experimental results.

Figure 5A:
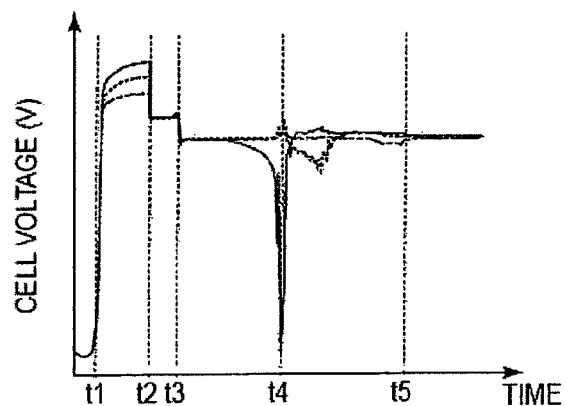
FIG. 5A shows an example of variation in the cell voltage from start-up of the fuel cell system.
Figure 5B:
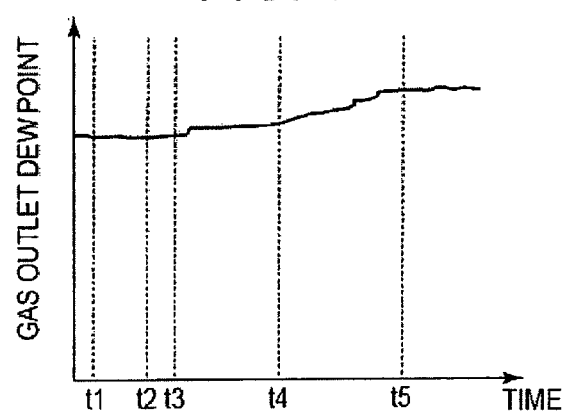
FIG. 5B shows an example of variation in the dew point temperature at the gas outlet from start-up of the fuel cell system.
Figure 5C:
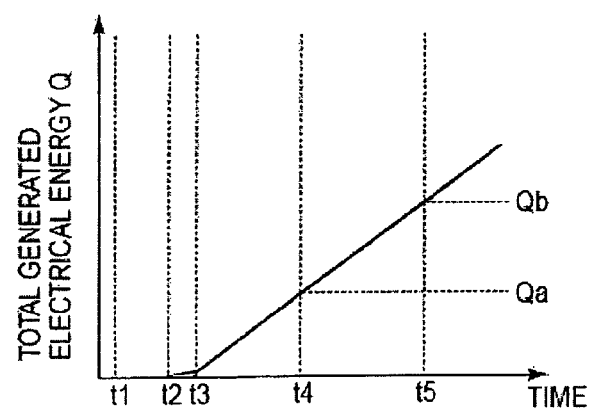
FIG. 5C shows an example of variation in the total generated electrical energy from start-up of the fuel cell system.

FIGS. 5A through 5C show the variation over time when power generation is performed at a certain steady load from the open circuit state. That is, FIG. 5A shows plural typical cell voltages, FIG. 5B shows the dew point temperature at the oxidant gas outlet in the fuel cell stack, and FIG. 5C shows the total generated electrical energy from start-up. As can be seen from FIGS. 5A-5C, the dew point at the gas outlet starts rising after a prescribed total generated electrical energy is reached (t4). At the same time, the cell voltage falls due to, for example, clogging caused by the presence of water. Then, when the dew point at gas outlet becomes constant or substantially constant (t5), the clogging disappears, and improvement with respect to variation in the cell voltage also result.

The aforementioned phenomenon is related to the water distribution between the cathode catalyst layer where the generated water is formed and the oxidant gas flow path in the separator that discharges the generated water. After the start of power generation, water generation starts, and this water accumulates inside the polymer electrolyte membrane, the catalyst layer and the gas diffusion layer (together known as the MEA) until the generated water reaches a prescribed level. When the MEA water content exceeds the steady state quantity, the generated water in the MEA flows out to the gas flow paths in the separator. Once the generated water flows out to the gas flow paths, the water discharge path from the catalyst layer to the gas flow paths becomes filled with water. Consequently, water can be discharged from the interior of MEA to the gas flow paths more easily due to the surface tension. Finally, it is believed that the residual water volume in the MEA becomes a prescribed residual water volume smaller than the maximum residual water volume.

An example of the method for estimating the residual water volume in the fuel cell stack by means of the total generated electrical energy from start-up will now be explained with reference to FIG. 6. When the fuel cell system is shut down soon after start-up so that the total generated electrical energy is less than a second prescribed value Q2, the water/air purge process before operation shutdown is not performed since the quantity of water generated is small.

When the total generated electrical energy exceeds the second prescribed value Q2 yet is smaller than a first prescribed value Q1, the water/air purge process is performed according to the total generated electrical energy based on a map of the residual water volume and the total generated electrical energy from start-up. More particularly, the residual water volume is estimated from the total generated electrical energy, and until the residual water volume reaches the target residual water volume Wt, air is fed to the cathode, and hydrogen is fed to the anode in order to perform the water/air purge process.

When the value of the total generated electrical energy is smaller than a third prescribed value Q3, which represents the maximum residual water volume determined by prior experiments, the residual water volume is estimated to be larger when the total generated electrical energy rises. Consequently, the water volume discharged increases as the total generated electrical energy rises. On the other hand, when the energy exceeds the third prescribed value Q3, the estimated residual water volume decreases while the total generated electrical energy rises. In this event, the discharged water volume decreases when the total generated electrical energy rises.

The water volume discharged from the stack in the water/air purge process depends on the temperature of the fuel cell stack, flow rates and pressure loss before the shutdown of operation. Hence, the temperature of the fuel cell stack is estimated or detected, and the discharged water volume is computed, with the relative humidity (RH) at the cathode outlet of the fuel cell stack being taken as 100%. Then, the water/air purge process duration and the air flow rate during the water/air purge process are determined to achieve the target residual water volume.

Also, when the total generated electrical energy from start-up exceeds first prescribed value Q1, the residual water volume in the fuel cell stack becomes the prescribed residual water volume determined from the temperature of the fuel cell stack, the operating pressure, the dew point temperature at the cathode inlet, the dew point temperature at the anode inlet, the anode gas flow rate, and the cathode gas flow rate. However, the operating pressure, dew point temperature at the cathode inlet, dew point temperature at the anode inlet, anode gas flow rate, and cathode gas flow rate can all be determined once the temperature of the fuel cell stack is determined. This is because the operating pressure, anode gas flow rate and cathode gas flow rate are determined using the operation map. Also, with regard to the dew point temperature at the anode inlet and the dew point temperature at the cathode inlet, the system that adopts a circulating system at the anode and a water recovery type humidity exchanger (WRD) for the cathode system becomes a passive system. Consequently, the residual water volume in the fuel cell stack is a constant or substantially constant value independent of the total generated electrical energy, and it can be estimated from the temperature of the fuel cell stack alone. Hence, the water/air purge process can be performed as a constant or substantially constant process independent of the total generated electrical energy.

Figure 7:
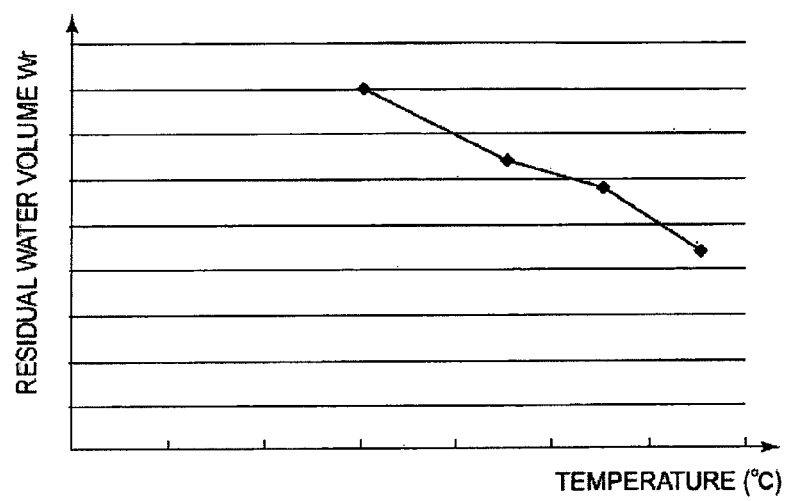
FIG. 7 is a diagram illustrating an example of the relationship between the temperature of the fuel cell stack and the residual water volume.

An example of the relationship between the temperature of the fuel cell stack and the residual water volume will be explained with reference to FIGS. 7 and 8. As shown in FIG. 7, the higher the temperature of the fuel cell stack, the smaller the residual water volume in the MEA. This is because the generated water volume is constant or substantially constant when the load is the same and the feed gas flow rate is the same, yet when the temperature rises, the saturated water vapor pressure rises, and the water volume carried out from the fuel cell stack when the same volumetric of gas flow is fed rises.

Figure 8:
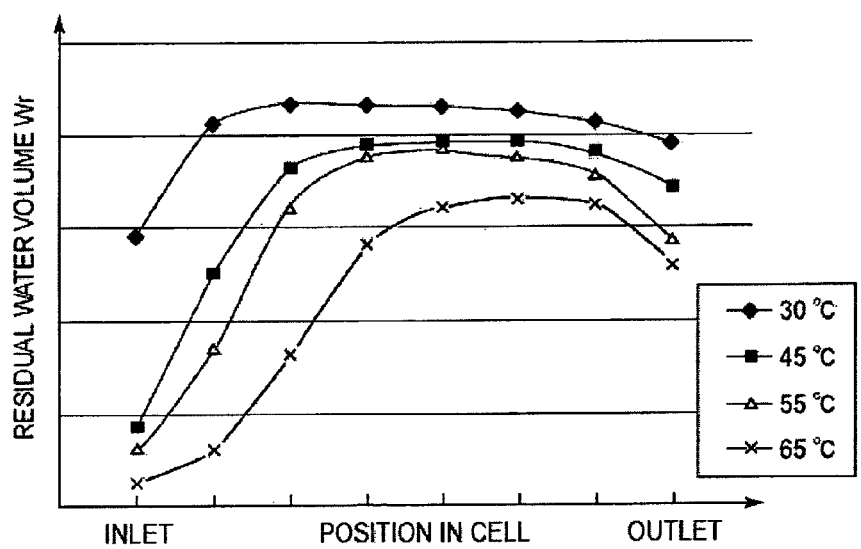
FIG. 8 is a diagram illustrating an example of the relationship between the temperature of the fuel cell stack and the residual water volume at the position within the cell.

As shown in FIG. 8, the higher the temperature of the fuel cell stack, the smaller the residual water volume shown on the left side of the graph. However, this portion corresponds to the gas inlet of the cell, and the higher the temperature, the lower the relative humidity at the inlet of the gas system. Consequently, the region where drying becomes significant near the upstream part of the MEA gas flow path becomes wider.

First Embodiment

Figure 1:
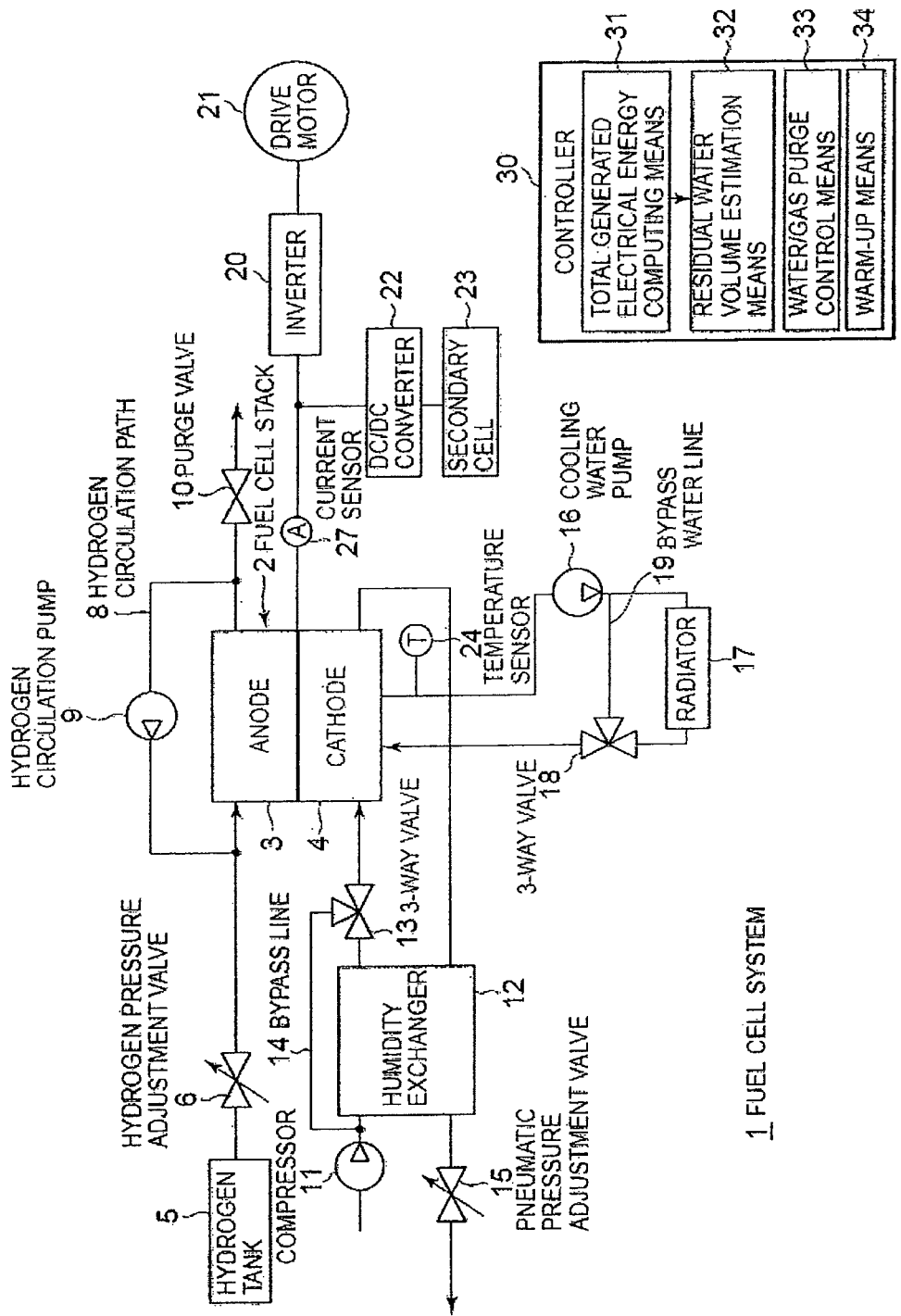
FIG. 1 is a system constitution diagram illustrating an example of the fuel cell system according to an embodiment of the present invention.

FIG. 1 is a system constitutional diagram illustrating an example of a first embodiment of the fuel cell system of the present invention. Here, fuel cell system 1 has a solid-state polymer type fuel cell stack 2. Hydrogen is fed as the fuel gas to anode 3 (fuel electrode) of fuel cell stack 2, and air is fed as the oxidant gas to cathode 4 (oxidant electrode).

The pressure of the high-pressure hydrogen in hydrogen tank 5 is adjusted by means of hydrogen pressure adjustment valve 6, and the hydrogen is then fed to anode 3. The hydrogen that is not consumed at anode 3 circulates through hydrogen circulation path 8 and hydrogen circulation pump 9 to the inlet of anode 3. Also, the hydrogen purge path to purge valve 10 is connected to hydrogen circulation path 8. When nitrogen or another impurity accumulates at anode 3 and in hydrogen circulation path 8, purge valve 10 can be opened to discharge the hydrogen gas that contains said impurity from the system.

Air as the oxidant gas is compressed by compressor 11 and is then fed to humidity exchanger 12. For example, humidity exchanger 12 may be a humidity exchanger that performs humidity exchange between the gases on the two sides with respect to a polyimide hollow yarn membrane. The humidity exchanger 12 is a humidifier that humidifies the air fed to the cathode by means of humidity exchange between the air fed to cathode 4 and the exhausted air containing vapor of the generated water exhausted from cathode 4. 3-way valve 13 is arranged between humidity exchanger 12 and the inlet of cathode 4.

Also, bypass line 14 for bypassing air is arranged between compressor 11 and 3-way valve 13. Said 3-way valve 13 feeds the air humidified by humidity exchanger 12 to cathode 4 during normal operation. In case of a purge operation, the valve is switched so that air that is compressed by compressor 11 and does not pass through humidity exchanger 12 is fed to cathode 4. Air pressure adjustment valve 15 is arranged downstream of humidity exchanger 12. By controlling the degree of openness of said valve, it is possible to adjust the cathode pressure.

Also, an internal cooling water flow path (not shown in the figure) is arranged inside fuel cell stack 2. Cooling water pump 16 for circulating the cooling water is arranged between radiator 17 and fuel cell stack 2. In order to bypass radiator 17 to circulate the cooling water at a low temperature, 3-way valve 18 and bypass water channel 19 are used.

Temperature sensor 24 for detecting the cooling water temperature is arranged at the cooling water outlet of fuel cell stack 2. The detected value is input to controller 30. The temperature sensor 24 is a temperature detection device that detects the temperature of the fuel cell stack. This temperature detection device is not limited to placement of a temperature sensor at the cooling water outlet. The temperature sensor may also be placed directly inside fuel cell stack 2.

The electrical power generated by fuel cell stack 2 is fed via current sensor 27 to inverter 20 or DC/DC converter 22. Said inverter 20 inverts the electrical power of rechargeable cell 23 boosted by said DC/DC converter or the electrical power generated by fuel cell stack 2 to AC power. Then, the electrical power is fed to drive motor 21, as well as compressor 11 and cooling water pump 16 as the auxiliary equipment of the fuel cell.

The regenerated electrical power to drive motor 21 is rectified by inverter 20, the voltage is stepped down by DC/DC converter 22 so that it can charge rechargeable cell 23. Also, the voltage of the electrical power generated by fuel cell stack 2 is stepped down by DC/DC converter 22 so that it can charge rechargeable cell 23.

The controller 30 in this example includes a total generated electrical energy computation device 31 that controls the engine fuel cell stack 1 and computes the value pertaining to said total generated electrical energy as the sum of the electrical energy generated by fuel cell stack 2 from start-up of the fuel cell system, and residual water volume estimation device 32 that estimates the residual water volume in the fuel cell stack based on said value pertaining to said total generated electrical energy computed by total generated electrical energy computation device 31 and the temperature of fuel cell stack 2 before shutdown of power generation detected by said temperature sensor 24 (temperature detection device). The controller 30 further includes water/air purge control device 33 that controls the water/air purge process before shutdown of operation of fuel cell stack 2 so that the water volume in the fuel cell stack changes from the residual water volume to the prescribed target residual water volume.

There are no particular restrictions on controller 30. In this first embodiment, the controller 30 can include a microprocessor comprising a CPU, program ROM, operation RAM and an input/output interface. The total generated electrical energy computation device 31, residual water volume estimation device 32 and water/air purge control device 33 are realized as programs executed by controller 30.

An explanation will now be given regarding an example of the operation of controller 30 in the first embodiment with reference to the flow charts shown in FIGS. 2 and 3. In the first embodiment, as the value pertaining to the total generated electrical energy as the sum of the electrical energy generated by fuel cell stack 2 from start-up of the fuel cell system, the total generated electrical charge (in units of Coulombs: C) by fuel cell stack 2 is used.

Figure 2:
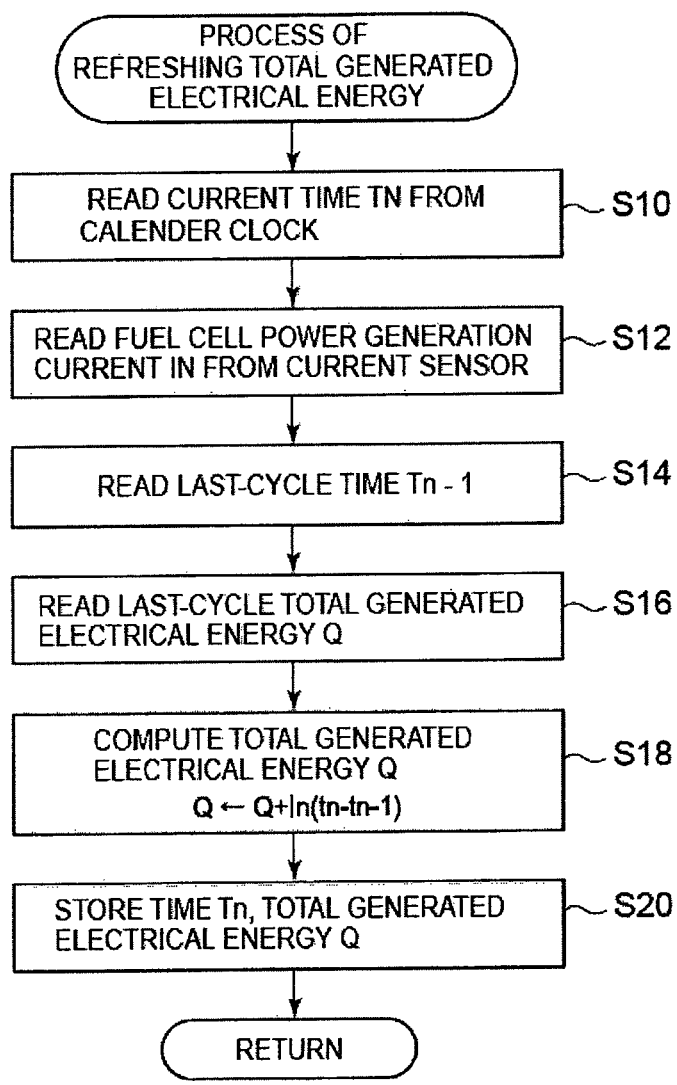
FIG. 2 is a flow chart illustrating an example of the process for refreshing the total generated electrical energy during operation of the fuel cell system in the embodiment.

FIG. 2 is a diagram illustrating an example of the subroutine for the refreshing process of the total generated electrical energy repeatedly called by the main routine of controller 30 during operation of the fuel cell system. This subroutine may be called once each prescribed time. Also, when there is a margin in the process of controller 30, the process may also be performed by calling it as needed.

When the subroutine shown in FIG. 2 is called, first, in step S10, the current time tn is read from the calendar clock of controller 30. Usually, the calendar clock is equipped inside the controller, it is a calendar clock that indicates the current day and time.

Then, in step S12, controller 30 reads generated current In of fuel cell stack 2 measured by current sensor 16 In step S14, controller 30 reads time tn−1 when the last cycle total generated electrical energy is refreshed. In S16, the last cycle refreshed total generated electrical energy Q is read. Then, in step S18, controller 30 computes arithmetic substitution Equation (1) to obtain the refreshed total generated electrical energy Q.

$$Q \leftarrow Q + In \times (tn - tn^{-1}) \quad (1)$$

In step S20, controller 30 stores time tn, and at the same time, stores the refreshed total generated electrical energy Q in memory, process control then returns to the main routine.

Figure 3:
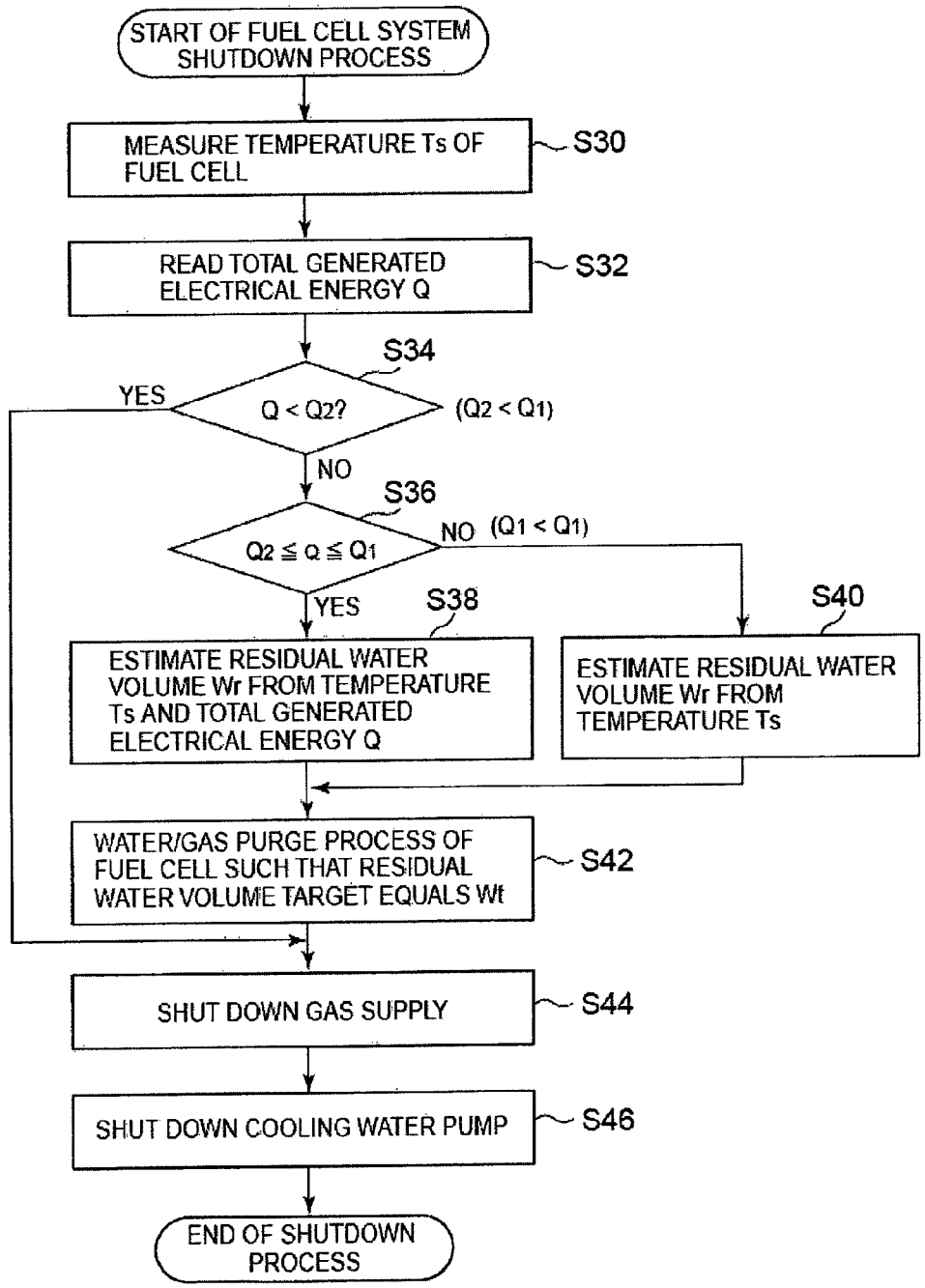
FIG. 3 is a flow chart illustrating an example of the process for shutdown of the fuel cell system in the embodiment.

FIG. 3 is a flow chart illustrating an example of the process for shutdown of fuel cell system 1 in Embodiment 1. When a request to shut down fuel cell system 1 is received, such as switching of the on/off key switch that controls fuel cell system 1 from on to off, the process for shutdown of the fuel cell system shown in FIG. 3 is started. First, in step S30, controller 30 reads the value measured by temperature sensor 24 as fuel cell stack temperature Ts.

Then, in step S32, controller 30 reads total generated electrical energy Q. In step S34, controller 30 determines whether said total generated electrical energy Q is smaller than the prescribed value Q2 (second prescribed value) as the judgment value used to determine whether the water/air purge process is to be performed. If the determination in S34 indicates that total generated electrical energy Q is smaller than Q2, and residual water volume Wr is small, the water/air purge process is not needed. Consequently, process control goes to step S44 to shut down the gas supply and the cooling water pump.

However, if the determination in step S34 indicates that total generated electrical energy Q exceeds Q2 and residual water volume Wr is large, the water/air purge process should be performed. As a result, process control then continues to step S36. In step S36, controller 30 determines whether total generated electrical energy Q is smaller than first prescribed value Q1 but larger than second prescribed value Q2 which is smaller than said first prescribed value Q1.

In steps S34 and S36, the prescribed value Q2 for the determination of total generated electrical energy Q is experimentally determined. More particularly, experiments can be performed to measure the residual water volume that allows power generation in warm-up power generation of the lowest electrical power required by the fuel cell system (such as the electrical power required for warming up compressor 11 and cooling water pump 16 as auxiliary equipment of the fuel cell) in the case when the fuel cell system is started at sub-freezing temperatures, because good hydrogen ion conductivity is exhibited in the solid-state polymer electrolyte membrane when the membrane contains water, in some degree.

In step S36, the prescribed value Q1 for judgment of total generated electrical energy Q is experimentally determined. More particularly, experiments are performed to measure the weight of each of the fuel cell stacks after operation times with different total generated electric energies from start-up at different temperatures of the fuel cell stacks. Then, the minimum total generated electrical energy is determined when the residual water volume becomes constant or substantially constant independently of the total generated electrical energy. This value is set as said prescribed value Q1.

If the result of the determination in step S36 is yes, the operation of controller 30 proceeds to S38. In step S38, residual water volume Wr that remains in MEA of fuel cell stack 2 is estimated according to fuel cell temperature Ts and total generated electrical energy Q from start-up. Process control then proceeds to step S42.

An explanation will now be given in more detail regarding an example of the method of estimating residual water volume Wr in step S38. In this estimation, the control map indicating the relationship between total generated electrical energy Q and residual water volume Wr as shown in FIG. 6 is prepared by storing the data at plural temperatures (such as at intervals of 5° C. in the range of 30° C. to 80° C.). The value corresponding to temperature Ts between the 5° C.-interval points of the control map can be determined by means of interpolation.

If the determination in step S36 is no, the processing performed by controller 30 proceeds to step S40. In step S40, the residual water volume is estimated by referencing the control map shown in FIG. 7 that indicates the relationship between fuel cell temperature Ts and residual water volume Wr. Process control then proceeds to step S42.

In step S42, water/air purge process is performed for fuel cell stack 2 until residual water volume Wr estimated for the fuel cell stack is reduced to the prescribed target residual water volume Wt. Said target residual water volume Wt is experimentally determined. More particularly, it is determined as the residual water volume that remains in the fuel cell stack with which gas feeding is not hindered due to flooding or freezing of the generated water in warm-up power generation although the start-up temperature of the fuel cell stack is below freezing. In order to determine said water volume, experiments are performed for starting the fuel cell system at sub-freezing temperatures by changing the residual water volume stepwise.

An explanation will now be given in more detail regarding the water/air purge process in step S42. First, controller 30 stops drawing the generated current from fuel cell stack 2 to inverter 20 and DC/DC converter 22. Then, controller 30 switches 3-way valve 13 to the side of bypass line 14 so that air is directly supplied from air compressor 11 to cathode 4 without passing through humidity exchanger 12. Also, controller 30 continues the operation of hydrogen circulating pump 9, while it closes hydrogen pressure adjustment valve 6 to stop the supply of fresh hydrogen.

Then, unhumidified air is fed to cathode 4 to perform water/air purge process. The purged water volume from fuel cell stack 2 in the water/air purge process is estimated as follows. First, the saturated water vapor pressure is computed from fuel cell temperature Ts. Then, with the relative humidity (RH) at the cathode outlet taken as 100%, the purged water volume per unit time is computed from the cathode pressure detected by a cathode pressure sensor (not shown in the figure) and the cathode flow rate detected by a cathode flow rate sensor (not shown in the figure). The water/air purge process time and the air flow rate in the water/air purge process are determined so that target residual water volume Wt is reached. After the water/air purge process time, the residual water volume left in the fuel cell stack is reduced to target residual water volume Wt, and process control proceeds to step S44 to stop the water/air purge process.

In step S44, air compressor 11 and hydrogen circulation pump 9 are shut down, and the supply of gas to fuel cell stack 2 is stopped. Then, in step S46, coolant pump 16 is shut down, and the process for shutdown of the fuel cell system comes to an end.

In this embodiment, the residual water volume left in the fuel cell stack is estimated based on the total generated electrical energy from start-up. More particularly, when the value of the total generated electrical energy is smaller than the third prescribed value, the estimated residual water volume is increased if the total generated electrical energy increases, and when the value of the total generated electrical energy exceeds the third prescribed value but is smaller than the first prescribed value, the estimated residual water volume is decreased when the value of the total generated electrical energy increases. Also, when the value of the total generated electrical energy exceeds the first prescribed value, the residual water volume in the fuel cell stack is kept constant or substantially constant independently of the value of the total generated electrical energy. Consequently, it is possible to estimate the residual water volume reliably.

Also, the higher the temperature of the fuel cell stack before shutdown of power generation, the smaller the estimated residual water volume. Consequently, it is possible to estimate the residual water volume reliably according to the temperature.

Also, when the fuel cell system is shut down, a water/air purge process is performed in the fuel cell stack corresponding to said value of the total generated electrical energy. More particularly, when the value of the total generated electrical energy exceeds the first prescribed value, it is taken as constant or substantially constant independently of the total generated electrical energy, and when the value of the total generated electrical energy exceeds the first prescribed value but is smaller than the second prescribed value, the water/air purge process is not performed. Consequently, the shutdown process (water/air purge process) is performed so that the residual water volume is constant or substantially constant (target residual water volume), so that the process can be stopped when the optimum wetness state of MEA is realized.

Modified First Embodiment

In this embodiment, residual water volume Wr is estimated, and the shutdown process is controlled. However, during in the start-up process, the estimation result of residual water volume Wr also can be used. More particularly, controller 30 includes warm-up process device 34, and warm-up power generation of the fuel cell stack is performed according to the total generated electrical energy at start-up.

If the fuel cell stack with a residual water volume is started at sub-freezing temperatures, most of the generated water is condensed in the fuel cell stack and is absorbed by the electrolyte membrane. However, there is a limit to the water volume that can be absorbed by the electrolyte membrane. When this limit is exceeded, the generated water seeps into the catalyst layer, leading to flooding that hinders the supply of gas to the catalyst layer. When flooding takes place, the cell voltage falls, and the warm-up power generation should be suspended. Consequently, by reducing the generated electrical power for warm-up when the residual water volume increases, it is possible to continue the warm-up power generation and heat the fuel cell stack quickly.

A more detailed explanation will now be given with reference to FIG. 12 and FIGS. 13A and 13B.

Figure 12:
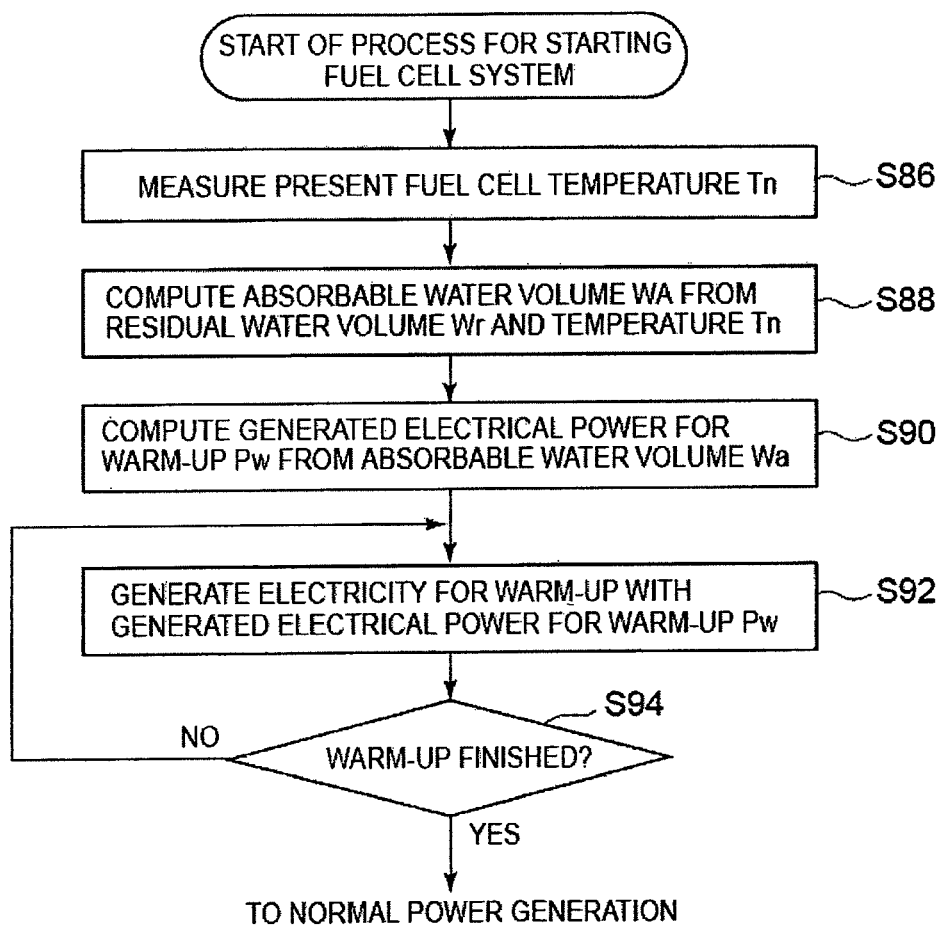
FIG. 12 is a flow chart illustrating an example of the process for start of the fuel cell system in the fourth embodiment.

FIG. 12 is a flow chart illustrating an example of the start-up process of fuel cell system 1 at sub-freezing temperatures. When a request to start fuel cell system 1 is received, such as when the on/off key switch that controls the fuel cell system is switched from off to on, the start-up process of the fuel cell system shown in FIG. 12 is started. First, in step S86, controller 30 measures the temperature of the fuel cell stack at the current time, that is, temperature Tn of fuel cell stack 2 at start-up. Temperature Tn may be measured using a temperature sensor arranged in fuel cell stack 2, or it may be measured by temperature sensor 24 set at the coolant outlet of fuel cell stack 2 shown in FIG. 1.

Figure 13:
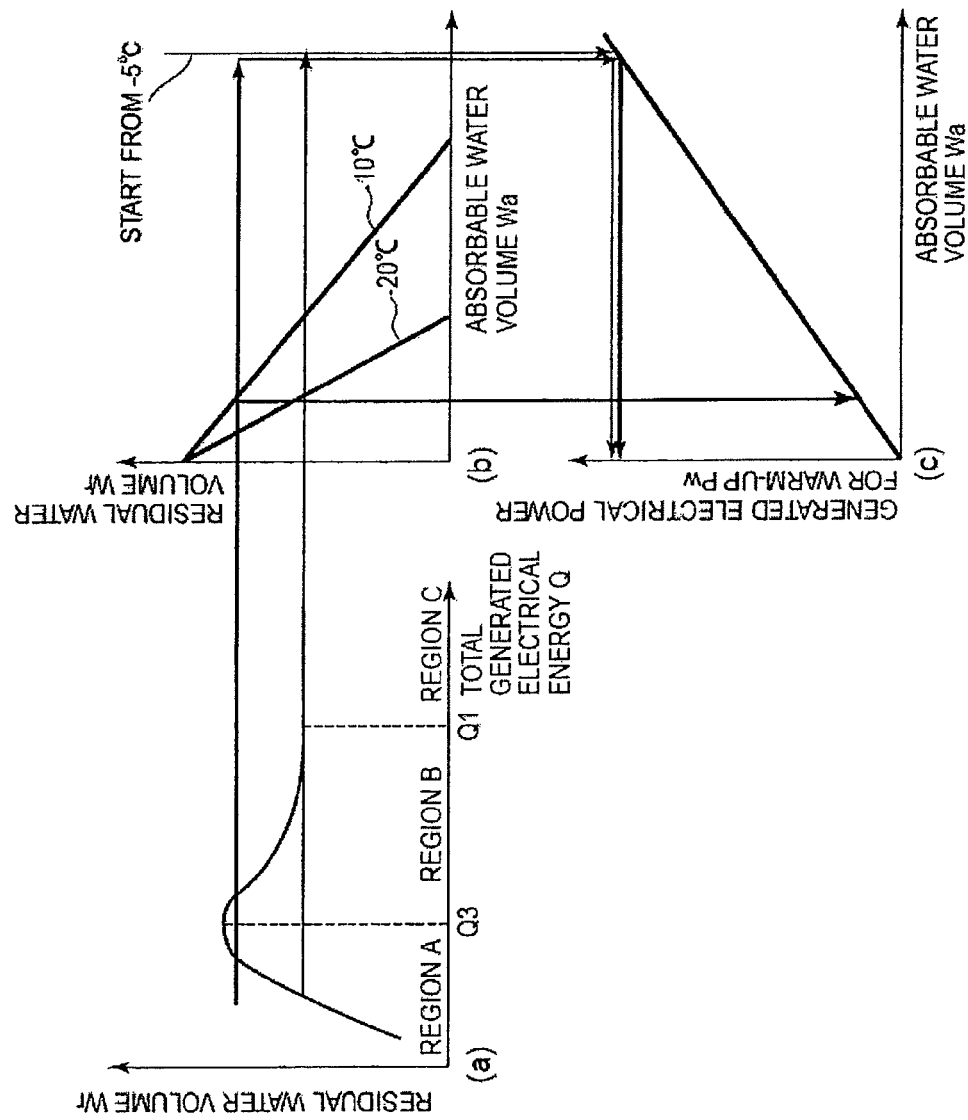
FIG. 13A shows an example of the relationship between the total generated electrical energy and the residual water volume.
FIG. 13B shows an example of the relationship between the absorbable water volume and the residual water volume.
FIG. 13C shows an example of the relationship between the absorbable water volume and the generated electrical power for warm-up.

Then, in step S88, controller 30 computes absorbable water volume Wa that can be absorbed by the MEA from residual water volume Wr and temperature Tn at start-up by referencing the control map shown in FIG. 13B. An explanation will now be given regarding the scheme used to determine absorbable water volume Wa. Using a single cell with sufficient thermal capacity, a purge is performed for a long time using a gas with various relative humidity levels so as to set the residual water volume of the cell. The residual water volume of the cell after a purge is performed for a long time using a gas at relative humidity levels is determined from weight, resistance, and so on. Then, the cell is cooled to a certain temperature (e.g., −20° C.) corresponding to the preset residual water volume, and power generation is started. Power generation can continue for a time corresponding to the residual water volume, that is, for a time when the MEA can absorb the generated water. When the generated water volume exceeds the absorbable water volume, the supply of gas is hindered, so that the cell voltage falls dramatically, or power generation is shut down. From the power generation time and the generated electrical energy, the generated water volume is determined, and this volume becomes the absorbable water volume.

Then, in step S90, controller 30 computes generated electrical power for warm-up Pw from absorbable water volume Wa by referencing the control map shown in FIG. 13C. An explanation will now be given regarding generated electrical power for warm-up Pw. When generated electrical power for warm-up Pw falls, there is a tendency for the generated water to be absorbed on the membrane side, and when generated electrical power for warm-up Pw increases, there is a tendency for the generated water to seep out to the catalyst layer. When the generated water seeps out to the catalyst layer, it hinders the diffusion of oxygen, leading to fall of the cell voltage and deterioration. In order to prevent this problem, power generation should be shut down. Consequently, it is necessary to set the generated electrical power for warm-up so that the generated water does not seep out to the catalyst layer.

Then, in step S92, controller 30 controls the supply of hydrogen and air corresponding to generated electrical power for warm-up Pw, and, at the same time, it draws generated electrical power for warm-up Pw. In step S94, controller 30 determines whether the prescribed warm-up completion conditions have been met. The prescribed warm-up completion conditions that may be used may be based on the temperature of fuel cell stack 2 and the voltage of fuel cell stack 2 corresponding to generated electrical power for warm-up Pw. In the determination in step S94, if the heater completion conditions have not been met, process control returns to step S92, and the warm-up power generation continues. If the determination in step S94 indicates that the warm-up completion condition have been met, process control goes to normal power generation, and the start-up of the fuel cell system comes to an end.

An explanation will now be given regarding the relationship between residual water volume Wr and generated electrical power for warm-up Pw with reference to FIG. 13A. FIG. 13A generally corresponds to FIG. 6. The region is divided into three regions. The total generated electrical energy corresponding to the maximum value of residual water volume Wr is designated as Q3 (third prescribed value). The region up to Q3 is region A; the region from Q3 to Q1 is region B; and the region beyond Q1 is region C. Also, as shown in FIG. 13(b), when residual water volume Wr increases, absorbable water volume Wa decreases. As shown in FIG. 13C, when absorbable water volume Wa rises, generated electrical power for warm-up Pw is increased. Based on said relationship, the basic idea is that when residual water volume Wr increases, generated electrical power for warm-up Pw is decreased.

More particularly, when the total generated electrical energy is in region B, the larger the total generated electrical energy, the higher the generated electrical power for warm-up Pw. On the other hand, in region A, the larger the total generated electrical energy, the lower the generated electrical power for warm-up Pw. In region C, generated electrical power for warm-up Pw is constant or substantially constant. As a result, it is possible to execute an optimum start-up below 0° C. corresponding to the water content state of each cell.

Also, as shown in FIG. 13B, the representative temperature of fuel cell stack 2 at start-up may be corrected. More particularly, the lower the start-up temperature, the lower the generated electrical power for warm-up Pw, while minimum generated electrical power for warm-up Pw can be the same. In other words, the lower the start-up temperature, the smaller the variation in generated electrical power for warm-up Pw corresponding to residual water volume Wr. For the same residual water volume Wr, the lower the start-up temperature Tn, the smaller the absorbable water volume Wa. When the temperature at start exceeds a prescribed level, generated electrical power for warm-up Pw is constant or substantially constant independently of the temperature of the fuel cell when power generation is shut down and the total generated electrical energy from the last start-up to shutdown cycle of power generation. This is because in the region below the freezing point at, e.g., −5° C., the MEA has the characteristic feature that the absorbable water volume is constant or substantially constant independently of residual water volume Wr. As a result, it is possible to execute the warm-up operation for sub-freezing start-ups more efficiently.

As explained above, in this modified example, when the fuel cell system is started, the warm-up process of the fuel cell stack is performed according to the value of the total generated electrical energy. More particularly, when the value of the total generated electrical energy is below the third prescribed value, the generated electrical power is reduced as the total generated electrical energy increases. When the value exceeds the third prescribed value, the generated electrical power is reduced as the total generated electrical energy increases. Also, when the value of the total generated electrical energy exceeds the first prescribed value, which is larger than the third prescribed value, the generated electrical power is constant or substantially constant independent of the total generated electrical energy. As a result, it is possible to prevent the water volume from becoming higher than the water volume that can be absorbed by the electrolyte membrane during the warm-up operation. Consequently, it is possible to continue the warm-up operation, and the warm-up process can be completed quickly.

Also, the lower the temperature of the fuel cell stack at start-up of power generation, the smaller the maximum generated electrical power. Hence, it is possible to execute the optimum warm-up process according to the temperature.

Second Embodiment

An explanation will be given regarding a second embodiment of the fuel cell system of the present invention. Unlike the first embodiment, in which the total generated electrical energy is used as the value pertaining to the total generated electrical energy, in the second embodiment, the total volume of water generated is used as the value pertaining to said total generated electrical energy. In computing the total volume of water generated WG, Equation (2) below is used to compute from the electrochemical reaction Equation (Equation 2) at the cathode, total generated electrical energy Q, and Faraday constant (F=NA×e).

$$\text{Total volume of water generated } WG(\text{mol}) = (1/2) \times Q/F \quad (2)$$

Figure 9:
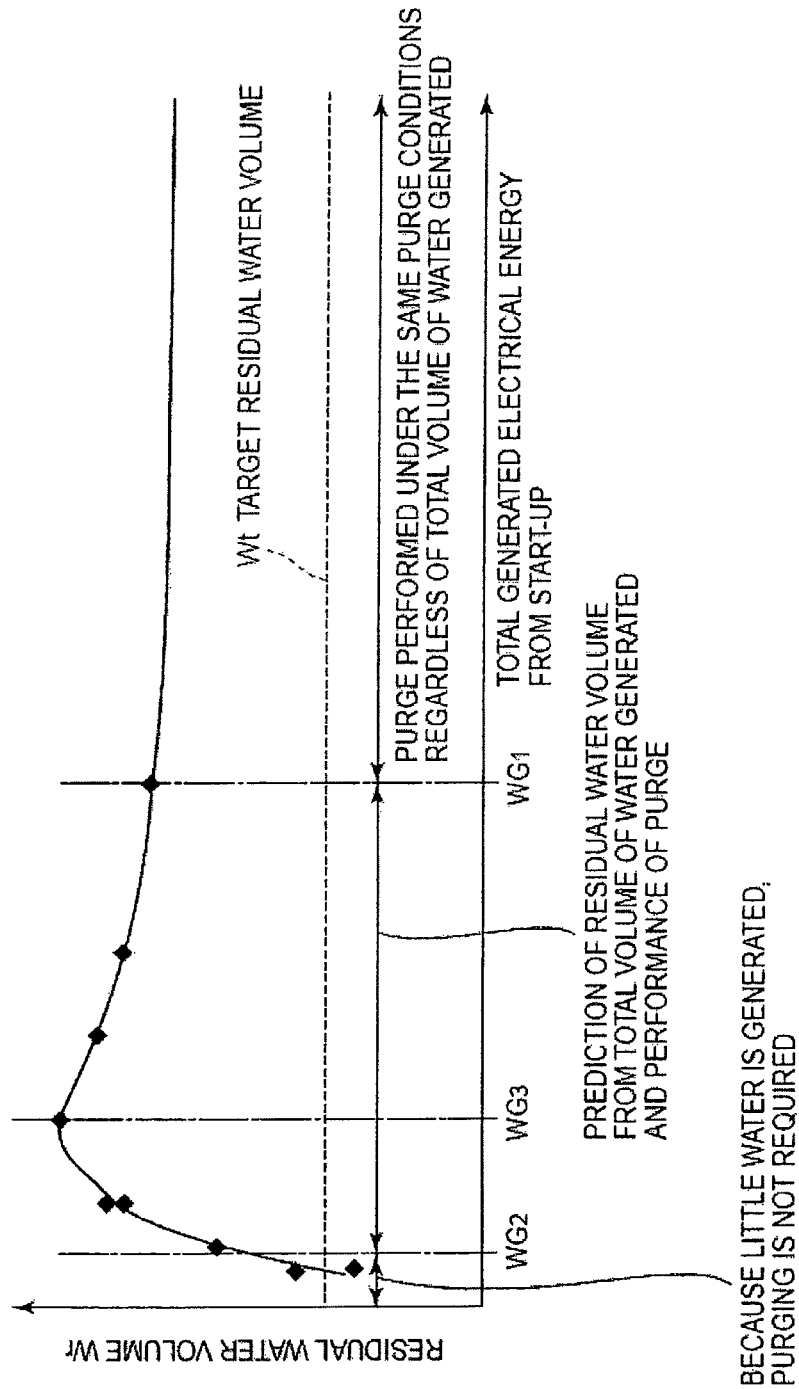
FIG. 9 is a diagram illustrating an example of the map for estimating the residual water volume from the total generated water volume during the period from start-up of the fuel cell system to shutdown of power generation in the embodiment shown in the second embodiment of the present invention.

In step S32 shown in FIG. 3, total generated electrical energy Q is converted into the total volume of water generated WG. Instead of the control map shown in FIG. 6 of the first embodiment, a control map that indicates the relationship between total volume of water generated WG and residual water volume Wr shown in FIG. 9 is used. As the judgment values in steps S34 and S36 in FIG. 3, first prescribed value WG1 and second prescribed value WG2 are used. The control map shown in FIG. 9, the first prescribed value WG1, second prescribed value WG2 and third prescribed value WG3 can be determined by performing the same experiments using the experimental method described for the first embodiment. The remaining features are the same as those of the first embodiment.

In this way, in the present embodiment, the residual water volume can be reliably determined from the total volume of water generated.

Third Embodiment

An explanation will now be given regarding a third embodiment of the fuel cell system of the present invention. Unlike the first embodiment, in which the total generated electrical energy is used as the value pertaining to said total generated electrical energy, in the third embodiment, the quantity of hydrogen consumed is used as the value pertaining to said total generated electrical energy. The quantity of hydrogen consumed is computed as follows. In step S12 shown in FIG. 2, the detection value of the current sensor is changed, and the hydrogen flow rate fed from hydrogen pressure adjustment valve 6 as well as the hydrogen pressure are read as detection value q of a hydrogen flow rate sensor (not shown in the figure) and detection value q of a hydrogen pressure sensor (not shown in the figure). Also, instead of total generated electrical energy Q, in step S18, quantity hydrogen consumed QH is computed using arithmetic substitution Equation (3).

$$QH \leftarrow QH + q \times p \times (tn - tn-1) \quad (3)$$

Figure 10:
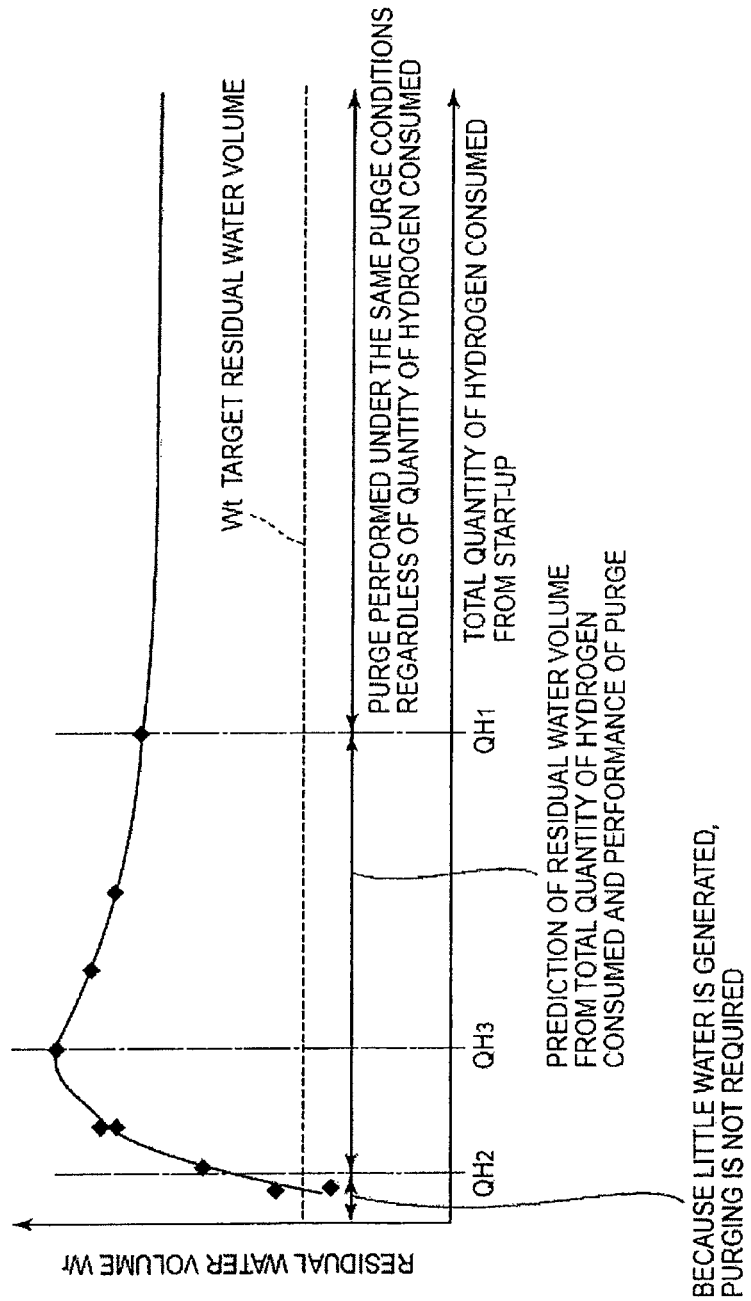
FIG. 10 is a diagram illustrating an example of the map for estimating the residual water volume from the quantity of hydrogen consumed during the period from start-up of the fuel cell system to shutdown of power generation in the third embodiment of the present invention.

Then, instead of the control map shown in FIG. 6 in the first embodiment, a control map showing the relationship of residual water volume Wr versus quantity of hydrogen consumed QH in FIG. 10 is used. Also, as judgment values in steps S34 and S36 in FIG. 3, first prescribed value QH1 and second prescribed value QH2 are used. The control map shown in FIG. 10, first prescribed value QH1, second prescribed value QH2, and third prescribed value QH3 can be determined experimentally in the same way as in the first embodiment. The remaining features are the same as those of the first embodiment.

In this third embodiment, it is possible to reliably estimate the residual water volume from the quantity of hydrogen consumed.

Fourth Embodiment

An explanation will now be given regarding the fourth embodiment of the fuel cell system of the present invention. Unlike the first embodiment in which the total generated electrical energy is used as the value pertaining to said total generated electrical power, in the fourth embodiment, the total generated electrical power is used as the value pertaining to said total generated electrical energy. The total generated electrical energy is computed as follows. In step S12 shown in FIG. 2, in addition to detection value In of the current sensor, detection value Vn of the fuel cell voltage sensor (not shown in the figure) is also read. Then, instead of total generated electrical energy Q, in step S18 total generated electrical power J is computed using arithmetic substitution Equation (4).

$$J \leftarrow J + In \times Vn \times (tn - tn-1) \quad (4)$$

Figure 11:
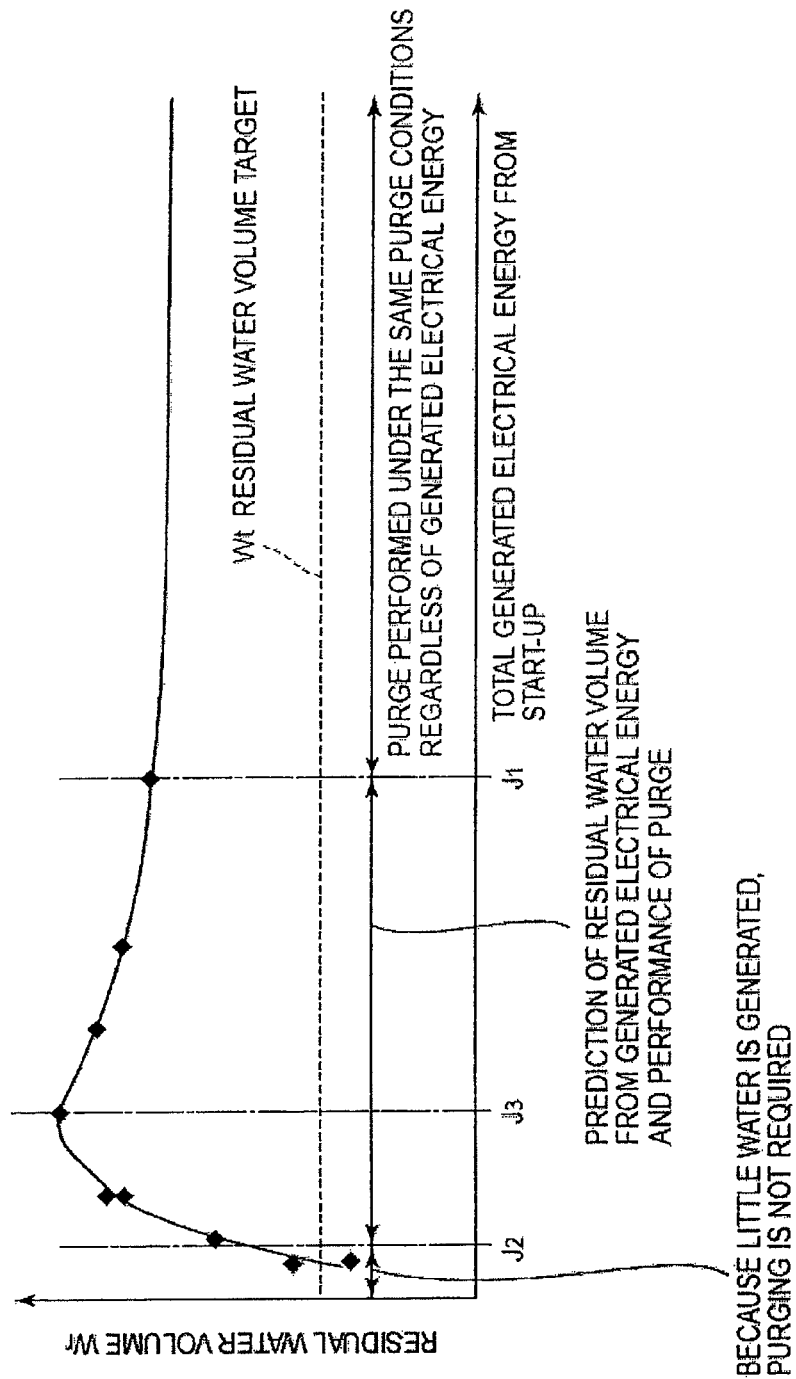
FIG. 11 is a diagram illustrating an example of the map for estimating the residual water volume from the total generated electrical energy during the period from start-up of the fuel cell system to shutdown of power generation in the fourth embodiment of the present invention.

Instead of the control map shown in FIG. 6 in the first embodiment, a control map showing the relationship of residual water volume Wr versus total generated electrical energy J shown in FIG. 11 is used. Also, as judgment values in steps S34 and S36 in FIG. 3, first prescribed value J1 and second prescribed value J2 are used. The control map shown in FIG. 11, first prescribed value J1, second prescribed value J2, and third prescribed value J3 can be determined in experiments in the same way as in the first embodiment The remaining features are the same as those in the first embodiment.

In this fourth embodiment, it is possible to reliably estimate the residual water volume from the total generated electrical energy.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A fuel cell system, comprising: a fuel cell stack that generates electrical power by electrochemical reaction of a fuel gas and an oxidant gas; a total generated electrical energy computation device that computes a value pertaining to the total generated electrical energy (Q) as a sum related to the electrical energy generated by said fuel cell stack in a time period from start-up of the fuel cell system until the fuel cell reaches a steady state; and a residual water volume estimation device that is programmed to estimate a residual water volume left in the fuel cell stack based on Q computed by said total generated electrical energy computation device, wherein the estimating comprises: (a) determining whether residual water volume is an increasing function of Q for values of Q below a first pre-determined threshold $Q_a$, for values of Q satisfying $Q<Q_a$; (b) determining whether residual water volume is an increasing function of Q for values of Q below a second pre-determined threshold $Q_b$, for values of Q satisfying $Q_a<Q<Q_b$; (c) determining whether residual water volume is a decreasing function of Q for values of Q below a third pre-determined threshold $Q_c$, for values of Q satisfying $Q_b<Q<Q_c$; (d) determining whether residual water volume is an essentially constant function of Q for values of Q satisfying $Q_c<Q$; and (e) estimating the residual water volume based on (a)-(d) to: (i) have a negligible value when (a) occurs; (ii) have a value given by a predetermined increasing function of Q when (b) occurs; (iii) have a value given by a predetermined decreasing function of Q when (c) occurs; and (iv) have a value given by a predetermined constant function of Q when (d) occurs.

2. The fuel cell system of claim 1, further comprising:
a temperature detecting device that detects the temperature of said fuel cell stack; and
wherein said residual water volume estimation device estimates said residual water volume to be smaller when the temperature of the fuel cell stack before shutdown of power generation is higher.

3. The fuel cell system of claim 1, further comprising:
a water/air purge control device for removing water contained in said fuel cell stack; and
wherein when said fuel cell system is shut down, said water/air purge control device performs a water/air purge process in the fuel cell stack based on Q.

4. The fuel cell system of claim 3, wherein Q satisfies $0<Q<Q_a$, said water/air purge process is not performed.

5. The fuel cell system of claim 1, further comprising:
a warm-up process device that controls the generated electrical power of said fuel cell stack when said fuel cell system is started, and generates power for warm-up of said fuel cell stack based on Q.

6. The fuel cell system of claim 5, wherein when Q satisfies $Q<Q_b$, the generated electrical power is decreased corresponding to the rise in said total generated electrical energy Q, and when Q satisfies $Q>Q_b$, the generated electrical power is decreased corresponding to the rise in said total generated electrical energy.

7. The fuel cell system of claim 5 or claim 6, wherein when Q satisfies $Q>Q_c$, the generated electrical power is kept substantially constant independent of said total generated electrical energy.

8. The fuel cell system of claim 5, further comprising:
a temperature detecting device for detecting the temperature of said fuel cell stack, such that the lower the fuel cell stack temperature at the start of power generation, the lower the maximum generated electrical power.

9. The fuel cell system of claim 1, wherein said value pertaining to the total generated electrical energy Q is any of the following values: the total generated electrical charge as the sum of the charge generated by the fuel cell stack from start-up of the fuel cell system, the hydrogen consumption quantity as the quantity of hydrogen consumed by the fuel cell system from start-up of the fuel cell system, the generated electrical power as the electrical power generated by the fuel cell stack from start-up of the fuel cell system, and the total generated water volume as the sum of the water volume generated by the fuel cell stack from start-up of the fuel cell system.

10. A method of operating a fuel cell system having a solid-state polymer fuel cell stack, the method comprising:
determining a value Q pertaining to the total generated electrical energy as a sum related to the electrical energy generated by said fuel cell stack in a time period from start-up of the fuel cell system until the fuel cell reaches a steady state;
estimating a residual water volume left in the fuel cell stack based on Q; and
purging the residual water left in the fuel cell system based on Q when the fuel cell system is shut down,
wherein the estimating comprises:
(a) determining whether residual water volume is an increasing function of Q for values of Q below a first pre-determined threshold $Q_a$, for values of Q satisfying $Q<Q_a$;
(b) determining whether residual water volume is an increasing function of Q for values of Q below a second pre-determined threshold $Q_b$, for values of Q satisfying $Q_a<Q<Q_b$;
(c) determining whether residual water volume is a decreasing function of Q for values of Q below a third pre-determined threshold $Q_c$, for values of Q satisfying $Q_b<Q<Q_c$;
(d) determining whether residual water volume is an essentially constant function of Q for values of Q satisfying $Q_c<Q$; and
(e) estimating the residual water volume based on (a)-(d) to:
(i) have a negligible value when (a) occurs;
(ii) have a value given by a predetermined increasing function of Q when (b) occurs;
(iii) have a value given by a predetermined decreasing function of Q when (c) occurs; and
(iv) have a value given by a predetermined constant function of Q when (d) occurs.

11. A fuel cell system, comprising: a fuel cell stack that generates electrical power by electrochemical reaction of a fuel gas and an oxidant gas; means for computing a value pertaining to the total generated electrical energy (Q) as a sum of the electrical energy generated by said fuel cell stack in a time period from start-up of the fuel cell system until the fuel cell reaches a steady state; and estimation means programmed to estimate a residual water volume left in the fuel cell stack based on Q computed by said computation means, wherein the estimating comprises: (a) determining whether residual water volume is an increasing function of Q for values of Q below a first pre-determined threshold $Q_a$, for values of Q satisfying $Q<Qa$; (b) determining whether residual water volume is an increasing function of Q for values of Q below a second pre-determined threshold $Q_b$, for values of Q satisfying $Q_a<Q<Q_b$; (c) determining whether residual water volume is a decreasing function of Q for values of Q below a third pre-determined threshold $Q_c$, for values of Q satisfying $Q_b<Q<Q_c$; (d) determining whether residual water volume is an essentially constant function of Q for values of Q satisfying $Q_c<Q$; and (e) estimating the residual water volume based on (a)-(d) to: (i) have a negligible value when (a) occurs; (ii) have a value given by a predetermined increasing function of Q when (b) occurs; (iii) have a value given by a predetermined decreasing function of Q when (c) occurs; and (iv) have a value given by a predetermined constant function of Q when (d) occurs.

12. The fuel cell system of claim 11, further comprising:
means for detecting the temperature of said fuel cell stack; and
wherein said means for estimating estimates said residual water volume to be smaller when the temperature of the fuel cell stack before shutdown of power generation is higher.

13. The fuel cell system of claim 11, further comprising:
means for removing water contained in said fuel cell stack; and
wherein when said fuel cell system is shut down, said means for removing performs a water/air purge process in the fuel cell stack based on Q.

14. The fuel cell system of claim 13, wherein Q satisfies $0<Q<Q_a$, said water/air purge process is not performed.

15. The fuel cell system of claim 11, further comprising:
means for controlling the generated electrical power of said fuel cell stack when said fuel cell system is started, and generating power for warm-up of said fuel cell stack based on Q.

* * * * *